UNITED STATES PATENT OFFICE.

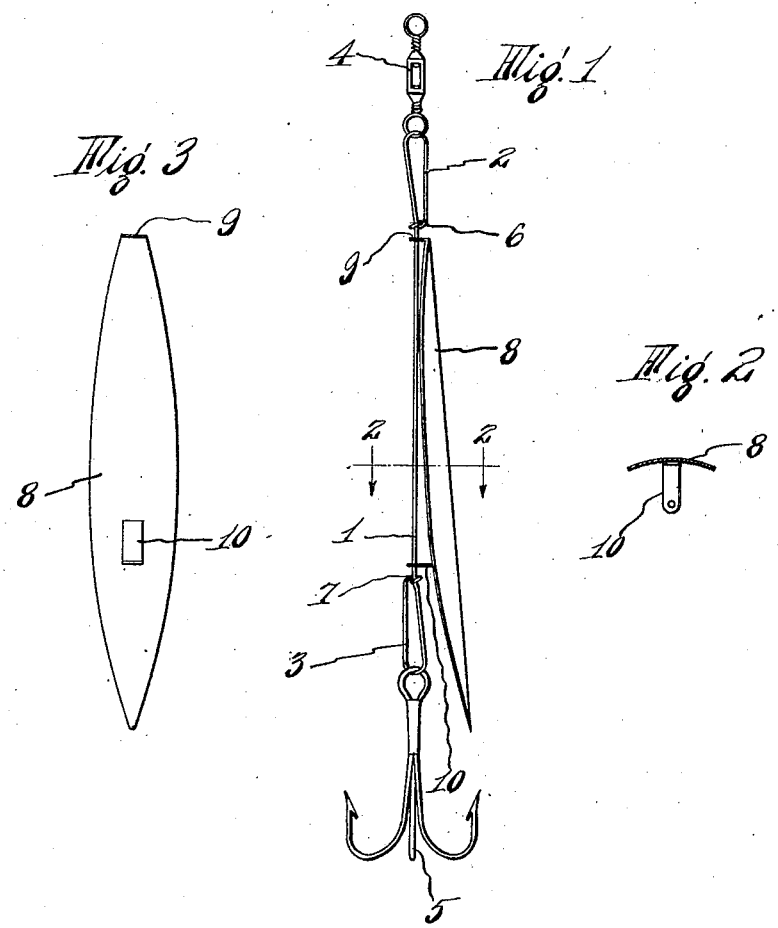

FREDERICK B. GREENE, OF NEW HAVEN, CONNECTICUT.

FISHING DEVICE.

1,376,934.  Specification of Letters Patent.  Patented May 3, 1921.

Application filed August 2, 1920. Serial No. 400,715.

*To all whom it may concern:*

Be it known that I, FREDERICK B. GREENE, a citizen of the United States, and a resident of New Haven, in the county of New Haven and State of Connecticut, have invented certain new and useful Improvements in Fishing Devices, of which the following is a specification.

This invention relates to fishing devices and more particularly to a casting and trolling spoon.

It is one object of this invention to provide a device of this character in which it is impossible for the hook to foul the spoon regardless of the relative positions assumed by the spoon and hook during casting.

A further object of the invention is the arrangement of the various elements of the device whereby the rotation of the spoon is effective to cause the hook to assume an approximately horizontal position as the device is pulled through the water.

An additional object of the invention is to provide a simple and effective casting and trolling device in which the spoon will start spinning as soon as it strikes the water.

In the accompanying drawings is disclosed an embodiment of the invention wherein—

Figure 1 is a side elevation;

Fig. 2 is a section on line 2—2 of Fig. 1;

Fig. 3 is a plan view of the spoon.

A stem 1, formed from a length of wire, is provided at either end with the loops 2 and 3, to which are respectively attached the swivel 4 and the multiple hook 5. These loops are formed by bending the ends of the wire back upon itself to form the hooks 6 and 7, which are then bent at approximately right angles to the wire. The wire is again bent to engage the hooks 6 and 7 with the body portion of the wire. The bending operation is performed in such a way that the hooks 6 and 7 are located at approximately right angles to the intermediate portion of the wire.

A spoon 8 is carried by the stem 1. The forward end 9 of the spoon is bent over and has an aperture therein through which extends the stem. Near the rear end of the spoon is provided a post 10, in the free end of which is an aperture which receives the stem 1. The bent-over forward end of the spoon and the post are located between the hooks 6 and 7, the latter being at a slightly greater distance from each other than the former, whereby the spoon is free to rotate on the stem and is allowed a slight longitudinal play. The fact that the hooks 6 and 7 are arranged at right angles to the stem obviates the use of the customary glass beads or the like on the stem for the elements 9 and 10 to bear against as the plane surface presented thereby does not interfere with the rotation of the spoon.

The spoon 8, lanceolate long and narrow, arcuate in cross section, as is clearly shown in Fig. 2, and extends along a straight line from the front end to the rear tip. The curvature of the spoon is the same throughout its length. The tip of the spoon extends considerably beyond the rear loop 3 and is substantially the same radial distance from the axis of rotation of the spoon as are the barbs of the multiple hook from their axis. The post 10 is so located on the spoon that the distance between it and any part of the loop 3 is materially less than the distance between the eye of the multiple hook and the barbs, thereby preventing a hook from fouling on the post. Furthermore the hook cannot foul the spoon elsewhere as the spoon everywhere presents a smooth arcuate surface off which the hook slides. The post maintains the spoon at a fixed inclination to the stem, which inclination has been determined in advance to be that which will produce maximum rotation of the spoon.

When this device is pulled through the water, the hooks assume an approximately horizontal position as distinguished from other spoons in which the hooks hang downwardly unless lifting means is applied to the hooks themselves. So long as the hooks are clean, the spoon rotates during its passage through the water, but if grass or weeds become entangled in the hook, the spoon ceases to rotate and simply oscillates. The oscillation of the spoon gives a different feel on the line from the rotation thereof and the user of such a spoon is quickly able to tell from the feel whether his hook is clean or fouled.

What I claim is:

1. A trolling and casting device comprising a stem, a hook carried by said stem, a spoon rotatably mounted on said stem, a rigid post carried at the rear of said spoon and engaging said stem for maintaining said spoon at a fixed inclination to said stem, said spoon being substantially lanceolate and the end thereof overlapping the shank of said hook and being spaced from said stem a distance substantially equal to the distance of the barb of the hook from the shank.

2. In a trolling and casting device, a stem consisting of a wire, bent at either end to form hooks in planes at right angles to the wire, which hooks are engaged with the wire to form loops, a lanceolate spoon rotatably mounted on said stem, and a rigid post carried by said spoon and operatively engaging said stem for maintaining said spoon at a fixed inclination to said stem.

3. A trolling and casting device comprising a stem, a spoon having an aperture at one end through which said stem extends, a rigid post carried near the other end of said spoon and rotatably connected with said stem, said spoon being arcuate in cross section and lanceolate in plan.

FREDERICK B. GREENE.